(12) United States Patent
Buckman et al.

(10) Patent No.: US 11,718,150 B2
(45) Date of Patent: Aug. 8, 2023

(54) HEATING VENTILATION AND AIR-CONDITIONING SYSTEM WITH AN INTERMEDIATE DOOR

(71) Applicant: Valeo North America, Inc., Auburn Hills, MI (US)

(72) Inventors: Earl Buckman, Troy, MI (US); Darshan Parikh, Troy, MI (US); Sally Dagher, Troy, MI (US); Steven Marshall, Troy, MI (US); Richard Sikorski, Troy, MI (US)

(73) Assignee: Valeo North America, Inc., Auburn Hills, MI (US)

( * ) Notice: Subject to any disclaimer, the term of this patent is extended or adjusted under 35 U.S.C. 154(b) by 142 days.

(21) Appl. No.: 17/331,181

(22) Filed: May 26, 2021

(65) Prior Publication Data

US 2022/0379685 A1 Dec. 1, 2022

(51) Int. Cl.
*B60H 1/00* (2006.01)

(52) U.S. Cl.
CPC ..... *B60H 1/00692* (2013.01); *B60H 1/00514* (2013.01); *B60H 1/00678* (2013.01)

(58) Field of Classification Search
CPC ............ B60H 1/00085; B60H 1/00514; B60H 1/00678; B60H 1/00692; B60H 1/00849
See application file for complete search history.

(56) References Cited

U.S. PATENT DOCUMENTS

| 5,899,806 A * | 5/1999 | Hase ................. | B60H 1/00692 454/160 |
| 5,907,954 A * | 6/1999 | Kettner .............. | B60H 1/00849 165/251 |
| 2015/0024669 A1* | 1/2015 | Gesell ................ | B60H 1/00849 454/75 |

FOREIGN PATENT DOCUMENTS

FR 3072331 B1 * 11/2019 ......... B60H 1/00692

* cited by examiner

*Primary Examiner* — Edelmira Bosques
*Assistant Examiner* — Michael James Giordano
(74) *Attorney, Agent, or Firm* — Osha Bergman Watanabe & Burton LLP

(57) ABSTRACT

A HVAC system (100) includes a housing (10) with at least one first inlet (20) and at least one second inlet (30) formed thereon, at least one first door (20a), at least one second door (30a) and an intermediate door (40). The first inlet (20) and the second inlet (30) is for ingress of a first fluid stream and a second fluid stream inside the housing (10). The first door (20a) and the second door (30a) moves with respect to the first inlet (20) and the second inlet (30) respectively to define an open configuration, a closed configuration and a partially open configuration thereof. The intermediate door (40) is disposed between the first inlet (20) and the second inlet (30) and moves between a deployed and an un-deployed configuration to respectively disrupt and allow fluid flow there across. The intermediate door (40) is a sliding door.

10 Claims, 4 Drawing Sheets

HEATING VENTILATION AND AIR-CONDITIONING SYSTEM WITH AN INTERMEDIATE DOOR

The present invention generally relates to a Heating Ventilation and Air-Conditioning (HVAC) system, more particularly, to air Management in the HVAC system.

Generally, conventional Heating Ventilation and Air-Conditioning (HVAC) systems are installed in a vehicle to provide comfort air-conditioning to vehicle occupants. Specifically, the HVAC system either supplies hot or cold air to the passenger's cabin depending on the operation mode selected by the vehicle occupants based on their requirement. Further, the HVAC system is configured to operate in two modes such as a fresh air mode and a re-circulation air mode. In the fresh air mode, the HVAC housing receives ambient air from the atmosphere through a fresh air inlet/interface. In the re-circulation air mode, the air from the passenger's cabin is re-circulated to the HVAC housing through a re-circulation air inlet/interface. More specifically, HVAC housing includes the fresh air interface with a fresh air door to control ingress of fresh air into the HVAC housing and a re-circulation air interface with a re-circulation door to regulate ingress of re-circulation air into the HVAC housing to define different operating modes, for example, the re-circulation mode in which air from within vehicle cabin that had been conditioned at least once by the HVAC system is re-circulated through evaporator/heater of the HVAC system for conditioning thereof, or fresh air mode in which fresh air from outside the vehicle cabin is passed through the evaporator/heater of the HVAC system for conditioning thereof.

The re-circulation air mode is provided in the HVAC system to reduce energy consumption by the HVAC system and is particularly useful in regions with extreme climate conditions. For example, while the vehicle in travelling through a colder region, the fresh air that is received in the HVAC housing is very cold, so more energy is required to process the very cold fresh air to comfort temperature conditions before directing the same to the vehicle cabin. In such cases, the re-circulated air that is already close to comfort temperature conditions, particularly, is at comparatively higher temperature than the fresh air is supplied to the HVAC system, accordingly, the HVAC system consumes comparatively less energy than when operating in the fresh air mode. However, there is a problem with the HVAC system operating in the re-circulation mode, which is frosting in doors and windshields due to the humidity content in the re-circulation air. Normally, the re-circulated air contains humidity due to presence of passengers in the vehicle cabin, so doors and windshields are frosted, the frosting of the windshield affects visibility that may cause accidents. To avoid such problems, there is a provision, wherein the HVAC system operates in a partial re-circulation air mode. In the partial re-circulation air mode, the fresh air inlet and the re-circulation air inlet are at least partially opened, both fresh air and re-circulated air is admitted into the housing through the fresh air inlet and the re-circulation air inlet respectively. The heat exchanger received inside the HVAC housing conditions both the fresh air stream and the re-circulation air stream instead of conditioning only the fresh air in the fresh air mode of operation or conditioning only the re-circulation air in the re-circulation mode of operation. The conditioned fresh air and the conditioned re-circulation air is mixed downstream of the heat exchanger in the direction of the flow of the air streams, the mixed and conditioned air is supplied to the vehicle cabin, thereby reducing the power consumption while still avoiding frosting of the doors and windshields.

However, in such partial re-circulation air mode of operation of the HVAC system, there is a possibility that fresh air entering the HHVAC housing through the fresh air inlet, pass through the HVAC housing, reaches the re-circulation inlet and escapes through the re-circulation inlet that is at least partially open in the partial re-circulation air mode of operation of the HVAC system and ultimately the fresh air enters into the passenger cabin through the re-circulation air inlet. In case the vehicle is traversing through a cold region, in the partial re-circulation mode of operation of the HVAC system, cold fresh air escapes or enters into the passenger cabin through the re-circulation air interface, thereby causing discomfort to the vehicle occupants and/or high energy consumption, thereby detrimentally impacting efficiency and performance of the HVAC system. Few prior art, such as for example US Published Patent application bearing application Ser. No. 16/998,357 suggests providing an intermediate butterfly flap operating between the fresh air interface and the re-circulation air interface to prevent fresh air from entering into the vehicle cabin through the re-circulation interface in the partial re-circulation mode of operation of the HVAC system, however, the intermediate butterfly flap is inefficient in preventing fresh air from entering into the vehicle cabin through the re-circulation interface, further, the intermediate butterfly flap requires more operating space for operation thereof, and is difficult to be packaged in limited space inside the HVAC housing.

Accordingly, there is a need for a HVAC system that prevents fresh air from entering the vehicle cabin through the re-circulation air interface when the HVAC system is operating in the partial re-circulation mode, thereby eliminating the problems arising due to entry of the fresh air into the vehicle cabin through the re-circulation air interface during operation of the HVAC in the partial re-circulation mode. Further, there is a need for a HVAC system configured with an intermediate blocking arrangement capable of selectively and efficiently disrupting fluid communication between the fresh air interface and the re-circulation air interface without requiring much operating space and hence can be packaged in limited space inside the HVAC housing.

An object of the present invention is to provide a HVAC system that obviates the problem faced by conventional HVAC systems arising due to entry of the fresh air in the vehicle cabin through the re-circulation air interface when the HVAC system is operating in partial re-circulation mode.

Another object of the present invention is to provide a HVAC system that efficiently prevents fresh air from entering into the vehicle cabin through the re-circulation interface.

Another object of the present invention is to provide a HVAC system configured with an intermediate blocking arrangement that selectively and efficiently disrupts fluid communication between the fresh air interface and the re-circulation air interface without requiring much operating space and hence can be packaged in limited space inside the HVAC housing.

Yet another object of the present invention is to provide a HVAC system configured with an intermediate blocking arrangement that selectively and efficiently disrupts fluid communication between the fresh air interface and the re-circulation air interface without interfering with operation of other adjacent elements disposed inside the HVAC housing.

Still another object of the present invention is to provide a HVAC system configured with an intermediate blocking arrangement that selectively and efficiently disrupts fluid communication between the fresh air interface and the re-circulation air interface, when the HVAC system is operating in partial re-circulation mode.

Another object of the present invention is to provide a HVAC system that is simple in construction.

Yet another of the present invention is to provide a HVAC system that is reliable and energy efficient.

In the present description, some elements or parameters may be indexed, such as a first element and a second element. In this case, unless stated otherwise, this indexation is only meant to differentiate and name elements which are similar but not identical. No idea of priority should be inferred from such indexation, as these terms may be switched without betraying the invention. Additionally, this indexation does not imply any order in mounting or use of the elements of the invention.

A Heating Ventilation and Air-Conditioning (HVAC) system, hereinafter referred to as HVAC system is disclosed in accordance with an embodiment of the present invention. The HVAC system includes a housing that receives a heat exchanger therein, at least one first inlet, at least one second inlet, at least one first door, at least one second door and an intermediate door. The first inlet is formed on the housing for ingress of a first stream of fluid inside the housing. The second inlet is formed in the housing for ingress of a second stream of fluid inside the housing. The first door moves with respect to the first inlet to define an open configuration, a closed configuration and a partially open configuration. The second door moves with respect to the second inlet to define an open configuration, a closed configuration, at least one partially open configuration. The intermediate door is disposed between the first inlet and the second inlet and moves between a deployed configuration and an un-deployed configuration, wherein the intermediate door in the deployed configuration disrupt fluid flow there across. The intermediate door is a sliding door.

In a variable ram air mode of operation of the HVAC system, the first door is in a partially open configuration, the second door is in closed configuration and the intermediate door is in un-deployed configuration.

In a first partial re-circulation mode of operation of the HVAC system, the first door is in open configuration, the second door is in a first partially open configuration and the intermediate door is in deployed configuration.

In a second partial re-circulation mode of operation of the HVAC system, wherein the first door is in open configuration, the second door is in a second partially open configuration and the intermediate door is in deployed configuration.

In a re-circulation air mode of operation of the HVAC system, the first door is in closed configuration, the second door is in open configuration and the intermediate door is in an un-deployed configuration.

Generally, the intermediate door in the deployed condition thereof is disposed proximal to the heat exchanger and in the un-deployed condition thereof is disposed away from the heat exchanger.

Preferably, the sliding door includes a rack that engages with and is actuated by a pinion.

Generally, the sliding door moves orthogonally with respect to a heat exchanger disposed within the housing.

Specifically, the first door is at least one of barrel type door and butterfly flap type of door.

Further, the second door is at least one of barrel type door and butterfly flap type of door.

In accordance with one embodiment of the present invention, the sliding door includes two portions movable relative to each other, at least one of the portions includes a rack that engages with and is actuated by a corresponding separate pinion.

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein.

Figure 1:
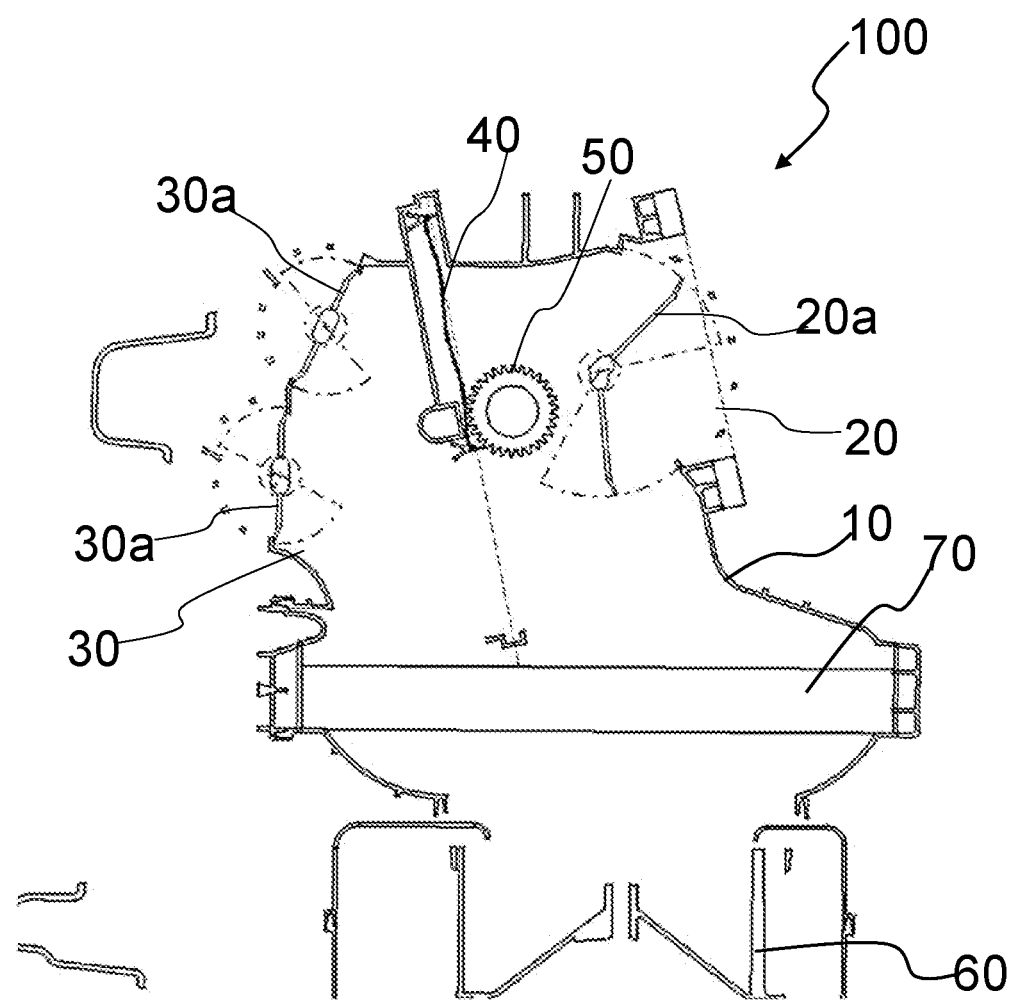
FIG. 1 illustrates a schematic representation of a Heating Ventilation and Air conditioning (HVAC) system in accordance with an embodiment of the present invention, wherein the HVAC system is operating in a variable ram air mode.

It must be noted that the figures disclose the invention in a detailed enough way to be implemented, said figures helping to better define the invention if needs be. The invention should however not be limited to the embodiment disclosed in the description.

Although the present invention is explained with example of HVAC system, wherein a blocking arrangement is disposed between a fresh air interface and a re-circulation air interface to selectively and efficiently disrupt fluid communication there between, without requiring much operating space, particularly, the blocking arrangement is of sliding door configuration that enables packaging thereof in limited space inside the HVAC housing. However, the present invention is not limited for use in HVAC systems only, the present invention is also be applicable for any vehicular and non-vehicular applications, where it is required to disrupt fluid communication between a first inlet and a second inlet for ingress of different fluid streams into a housing by providing a blocking arrangement between the first inlet and the second inlet, wherein the blocking arrangement is required to efficiently block the air stream entering inside the housing through the first inlet from escaping out of the housing through the second inlet, while still operating within less operating space and being packaged in a limited space inside the housing.

A Heating Ventilation and Air-Conditioning (HVAC) system 100, hereinafter referred to as HVAC system 100 is disclosed in accordance with an embodiment of the present invention. The HVAC system 100 includes a housing 10, at least one first inlet 20, at least one second inlet 30, at least one first door 20*a*, at least one second door 30*a* and an intermediate door 40.

In accordance with an embodiment of the present invention, the housing 10 is having a modular construction and is configured by assembling at least two portions. Preferably, the housing includes a first portion 10*a* and a second portion 10*b* that are assembled together to define an enclosure to receives elements such as flaps or doors and at least one heat exchanger 70 therein. The housing 10 is in fluid communication with a blower housing that receives a blower 60 therein. The blower 60 configures pressure difference across the heat exchanger 70, particularly, across at least one of a heater and an evaporator received inside the housing 10 to facilitate flow of fluid through at least one of the evaporator and the heater. The heater and the evaporator processes/conditions the fluid passed there through. The conditioned fluid is directed to the doors for egress from the housing 10. The modular configuration of the housing 10 provides convenient access to the elements disposed inside the housing 10 for convenient service, maintenance and replacement of the elements disposed within the housing 10.

The first inlet 20, also referred to as fresh air inlet or fresh air interface 20 is formed on the housing 10 for ingress of a first stream of fluid inside the housing 10. Specifically, the first inlet 20 is inlet for ingress of fresh air inside the housing 10, more specifically, the first inlet 20 is for the admission of fresh air from outside the vehicle into the housing 10. The first door 20a moves with respect to the first inlet 20 to define an open configuration, a closed configuration and a partially open configuration. In the open configuration of the first door 20a with respect to the first inlet 20, the first door 20a is so disposed with respect to the first inlet 20 that fluid communication is permitted between inside and outside of the housing 10 through the first inlet 20. In the closed configuration of the first door 20a with respect to the first inlet 20, the first door 20a substantially blocks the first inlet 20 and disrupts air flow there through. In the partially open configuration of the first door 20a with respect to the first inlet 20, the first door 20a partially blocks the first inlet 20 and partially allows air flow there through. The first door 20a is driven by an electric drive that includes brushed DC motors with potentiometers to sense the position of the first door 20a, three-phase brushless DC (BLDC) motors that use back electromotive force (back EMF) to measure positions or stepper motors that count the number of steps to measure the positions of the first door 20a. Generally, the first door 20a is at least one of barrel type door and butterfly flap type of door. However, the present invention is not limited to any particular configuration of the first door 20a and the electric drive used to regulate the opening and closing of the first door 20a, as far as the first door 20a is capable moving relative to the first inlet 20 to define the open configuration, the closed configuration and the partially open configuration thereof.

The second inlet 30, also referred to as re-circulation air inlet or re-circulation air interface 30, is formed in the housing 10 for ingress of a second stream of fluid inside the housing 10. Specifically, the second inlet is for the ingress of re-circulation air into the housing 10, more specifically, the second door is for the admission of the air from inside the vehicle cabin into the housing 10. The second door 30a moves relative to the second inlet 30 to define the at least partially open configuration of the second inlet 30 in the re-circulation air mode or the partial re-circulation air mode of operation of the HVAC system 100, wherein the air in the vehicle cabin that was at least once conditioned by the HVAC system 100 is re-circulated back to the housing 10 of the HVAC system 100 for re-conditioning thereof. Generally, the first inlet 20 and the second inlet 30 are disposed on opposite sides of the housing 10. The second door 30a moves with respect to the second inlet 30 to define an open configuration, a closed configuration, at least one partially open configuration. There could be one or more second doors 30a moving relative to one or more second inlets 30 to define the open configuration, the closed configuration and the partially open configuration of the second doors 30a. More specifically, as illustrated in the accompanying FIGURES, two second doors move relative to each other and the second inlets 30 to define the open configuration, the closed configuration and the partially open configuration of the second doors 30a. Such configuration of the multiple second doors 30a operating in conjunction to define the open configuration, the closed configuration and the partially open configuration provides better control over the blocking and unblocking of the second inlet 30 and better control over the fluid flow through the second inlet 30. The second door 30a is at least one of barrel type door and butterfly flap type of door. Similar to the first door 20a, the second door 30a is also driven by an electric drive. The configuration and working of the second doors 30a to define the open configuration, the closed configuration and the partially open configuration thereof is similar to the operation of the first door 20a and is thereof not described in detail for the sake of brevity of the present disclosure.

Since the first inlet 20 and the second inlet 30 are generally disposed opposite to each other, there are chances that the fresh air entering inside the housing 10 through the first inlet 20 directly escapes out of the housing 10 through the second inlet 30 without being conditioned by the heat exchanger 70 disposed inside the housing 10 and enters into the passenger cabin through the second inlet 30 when the first inlet 20 and the second inlet 30 are in at least partially open configuration, thereby causing discomfort to the vehicle occupants or high energy consumption and detrimentally impacting efficiency and performance of the HVAC system 100. In order to prevent the air (fresh air) entering inside the housing 10 from the first inlet 20 to directly escape out of the housing 10 through the second inlet 30 when both first inlet 20 and the second inlet 30 is in at least partially open configuration, an intermediate door 40 is disposed between the first inlet 20 and the second inlet 30. The intermediate door 40 is disposed between the first inlet 20 and the second inlet 30 and moves between a deployed configuration (illustrated in FIG. 2 and FIG. 3) and an un-deployed configuration (illustrated in FIG. 1 and FIG. 4), wherein the intermediate door 40 in the deployed configuration thereof is disposed proximal to the heat exchanger 70 and disrupts fluid flow across the intermediate door 40. The intermediate door 40 is a sliding door.

The HVAC system 100 of the present invention operates in different operating configurations defined based on different combinations of the operating configurations of the first door 20a, the second doors 30a and the intermediate door 40. More specifically, the HVAC system 100 can operate in a variable ram air mode illustrated in FIG. 1, a first partial re-circulation mode illustrated in FIG. 2, a second partial re-circulation mode illustrated in FIG. 3 and a re-circulation air mode illustrated in FIG. 4.

In a variable ram air mode of operation of the HVAC system 100, the first door 20a is in at least partially open configuration, the second doors 30a are in closed configuration and the intermediate door 40 is in un-deployed configuration as depicted in the FIG. 1. More specifically, in the at least partially open configuration of the first door 20a, the first door 20a allows at least some air flow across the first inlet 20. In the ram air mode of operation of the HVAC system 100, the first door 20a at least partially unblocks the first inlet 20 to permit the fresh air from outside to enter inside the housing 10. Due to the second inlet 30 being closed by the second doors 30a and pressure difference created across the heat exchanger 70 by the blower 60, the fresh air received inside the housing 10 through the first inlet 20 passes through the heat exchanger 70 and is conditioned by the heat exchanger 70 and the conditioned fresh air is delivered to the vehicle cabin. More particularly, in the ram air mode of operation of the HVAC system 100, only the fresh air received inside the housing 10 through the first inlet 20 is conditioned by the heat exchanger 70 disposed inside the housing 10 and the conditioned fresh air is delivered to the vehicle cabin. However, in the ram air mode of operation, there is more energy consumption due to temperature difference between temperature of fresh air and desired temperature to be achieved by conditioning the fresh air by passing the fresh air through the heat exchanger.

Figure 2:
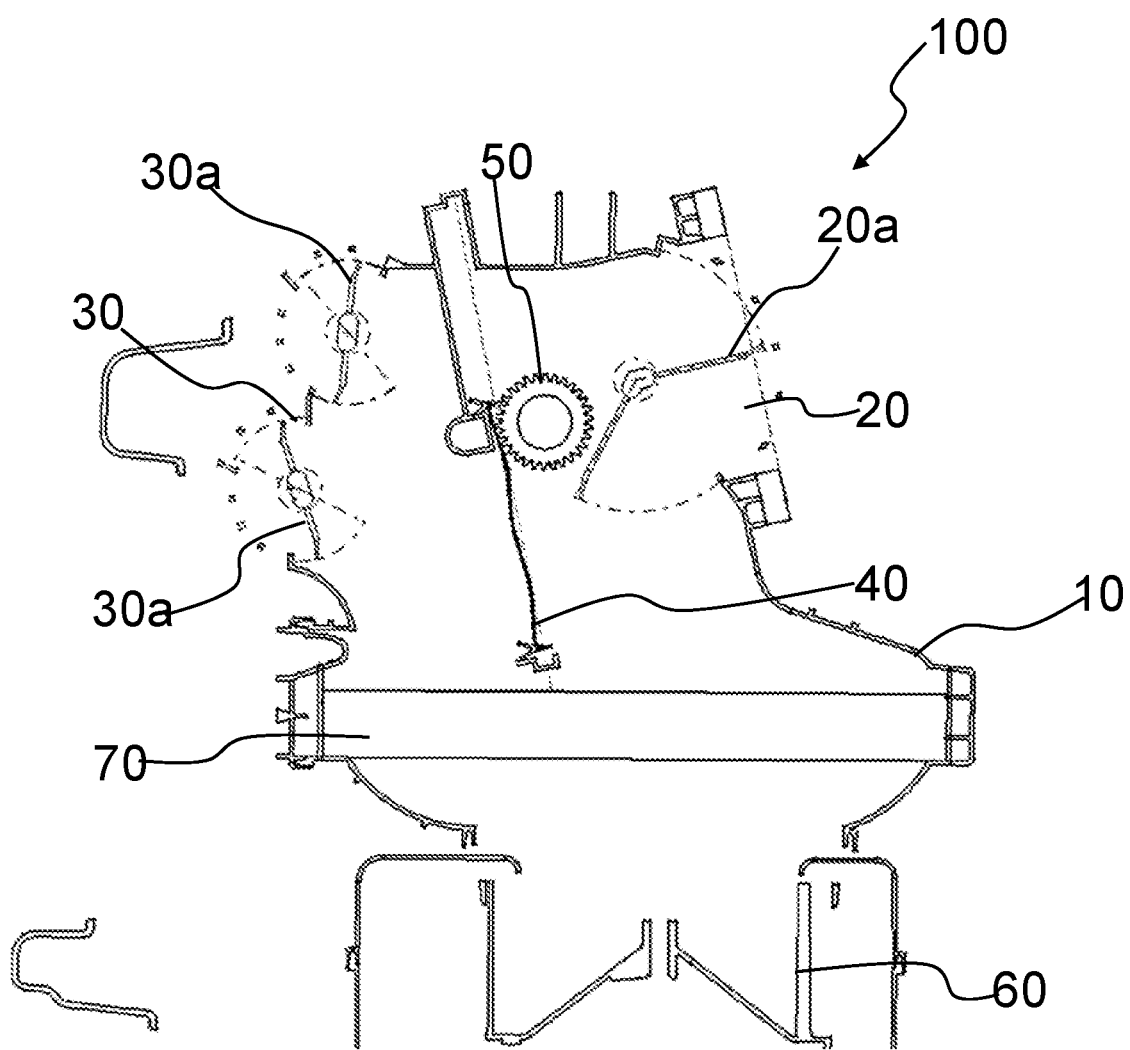
FIG. 2 illustrates a schematic representation of HVAC system of FIG. 1 operating in a first partial re-circulation mode.

In a first partial re-circulation mode of operation of the HVAC system 100, the first door 20a is in open configuration, the second doors 30a are in a first partially open configuration and the intermediate door 40 is in deployed configuration as depicted in the FIG. 2. More specifically, in the open configuration of the first door 20a, the first door 20a is positioned relative to the first inlet 20 to allow unrestricted flow of fresh air across the first inlet 20. As the intermediate door 40 disposed between the first inlet 20 and the second inlet 30 is in the deployed configuration thereof, the intermediate door 40 prevents the fresh air received in the housing 10 through the first inlet 20 from reaching and escaping out of the housing 10 through the second inlet 30. Due to pressure difference created by the blower 60 across the heat exchanger 70, the fresh air received inside the housing 10 through the first inlet 20 is passed through the heat exchanger 70 and is processed thereby. The second doors 30 in the at least partially open configuration thereof, allows at least some re-circulation air flow across the second inlet 30. Due to pressure difference created by the blower 60 across the heat exchanger 70, the re-circulated air received inside the housing 10 through the second inlets 30 is also passed through the heat exchanger 70 and conditioned by the heat exchanger 70. Due to the intermediate door 40 disposed between the first inlet 20 and the second inlet 30 being in the deployed configuration thereof, the fresh air received in the housing through the first inlet 20 and the re-circulation air received in the housing 10 through the second inlet 30 are prevented from mixing before entering the heat exchanger 70. The fresh air and the re-circulation air processed by the heat exchanger 70 is mixed downstream of the heat exchanger 70 in the air flow direction and the processed and mixed air is delivered to the vehicle cabin. More particularly, in the partial re-circulation mode of operation of the HVAC system 100, both the fresh air and re-circulation air received inside the housing 10 through the first inlet 20 and the second inlet 30 respectively is conditioned by the heat exchanger 70 disposed inside the housing 10 and later mixed downstream of the heat exchanger 70, the conditioned and mixed air is then delivered to the vehicle cabin.

Figure 3:
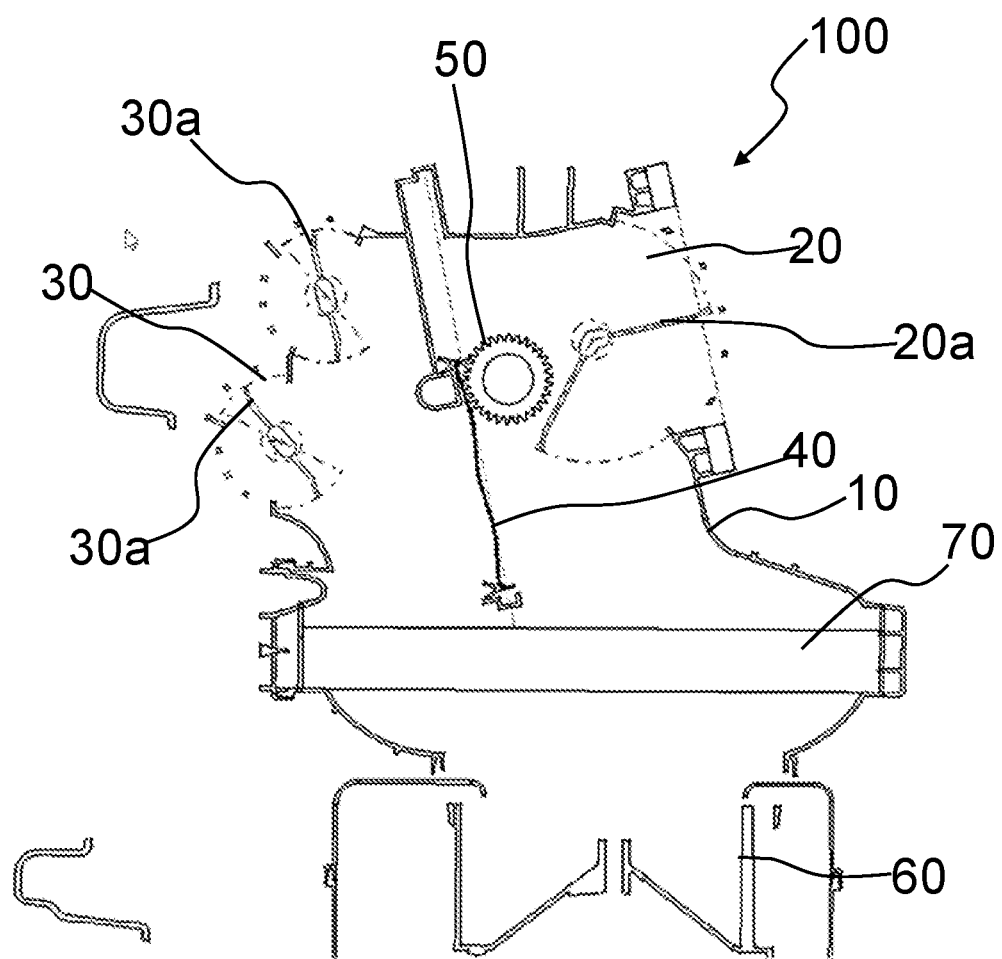
FIG. 3 illustrates a schematic representation of HVAC system of FIG. 1 operating in a second partial re-circulation mode.

In a second partial re-circulation mode of operation of the HVAC system 100, wherein the first door 20a is in open configuration, the second door 30a is in a second partially open configuration different from the first partially open configuration and the intermediate door 40 is in deployed configuration as depicted in the FIG. 3. The second partial re-circulation mode of operation of the HVAV system 100 is similar to the first partial re-circulation mode, except that angular position of the second door 30a, particularly, degree of opening thereof defined by the position of the second door 30a with respect to the second inlet 30 in the second partial re-circulation mode is different than the angular position of the second doors 30a in case of the first partial re-circulation mode and for the sake of brevity of the present document is not described in detail. By operating in the partial re-circulation mode of operation, either partial re-circulation mode or second partial re-circulation mode of operation of the HVAC system 100, the drawbacks associated with operation in only fresh air mode i.e. high power consumption and drawbacks associated with operation in only re-circulation mode i.e. frosting of the doors and windshields is prevented.

Figure 4:
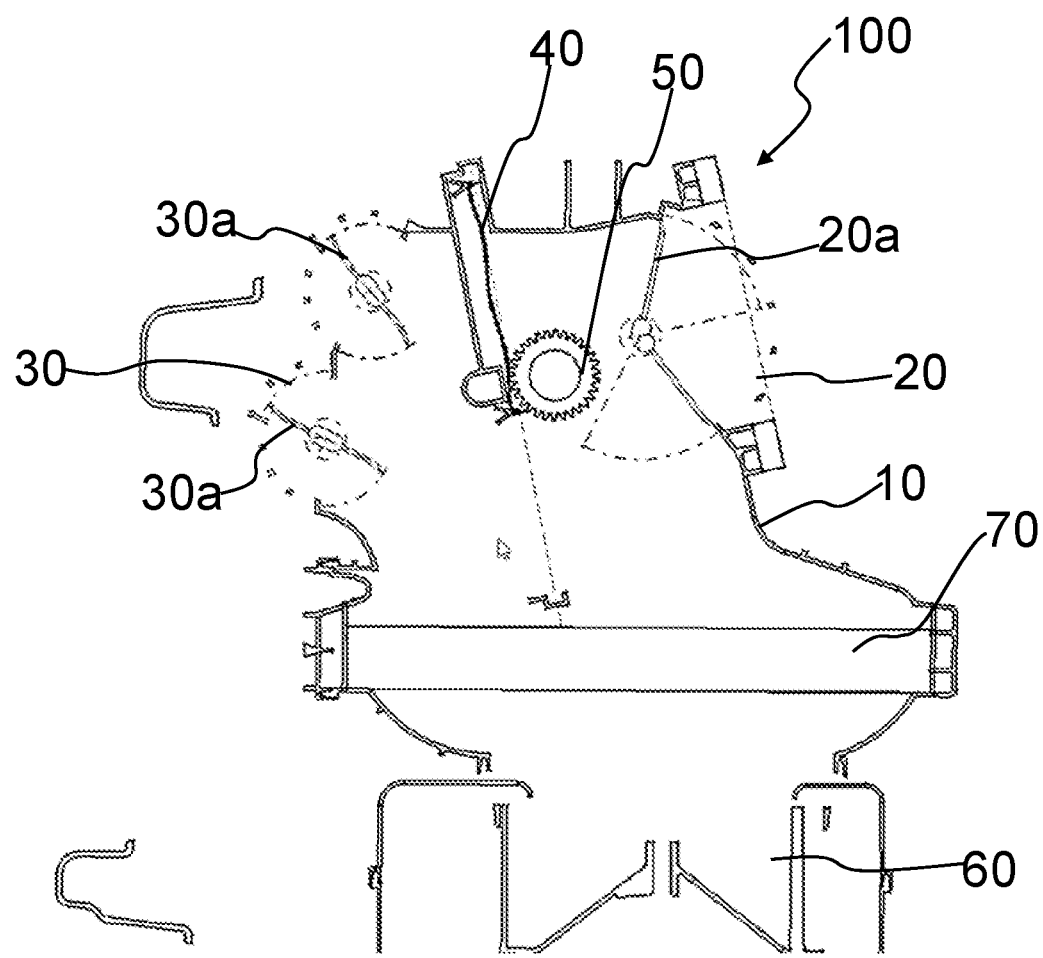
FIG. 4 illustrates a schematic representation of HVAC system of FIG. 1 operating in a fresh air mode of operation.

In the re-circulation air mode of operation of the HVAC system 100, the first door 20a is in closed configuration, the second doors 30a are in open configuration and the intermediate door 40 is in the un-deployed configuration as depicted in the FIG. 4. More specifically, in the open configuration of the second doors 30a, the second doors 30a allows re-circulation air to flow across the second inlet 30. In the re-circulation air mode of operation of the HVAC system 100, the second doors 30a unblocks the second inlet 30 and the re-circulation air from the vehicle cabin enters inside the housing 10 through the second inlet 30. Due to the first inlet 20 being closed by the first door 20a and pressure difference created across the heat exchanger 70 by the blower 60, the re-circulation air received inside the housing 10 from the vehicle cabin through the second inlet 30 is passed through the heat exchanger 70 and is conditioned by the heat exchanger 70 and the conditioned re-circulated air is delivered to the vehicle cabin. More particularly, in the re-circulation air mode of operation of the HVAC system 100, only the re-circulation air received inside the housing 10 through the second inlet 30 is conditioned by the heat exchanger 70 disposed inside the housing 10 and the conditioned re-circulated air is delivered to the vehicle cabin.

In accordance with an embodiment of the present invention, the intermediate door 40 in the deployed condition thereof is disposed proximal to the heat exchanger 70 and is preferably in contact with the heat exchanger 70 to disrupt air flow there across. In the un-deployed condition the intermediate door 40 is disposed away from the heat exchanger 70 to allow fluid flow between opposite sides of the intermediate door 40. In accordance with an embodiment of the present invention, the intermediate door 40 is a sliding type door that efficiently blocks the fresh air entering inside the housing 10 through the first inlet 20 from reaching the second inlet 30 and escaping out of the housing 10 through the second inlet 30, when the HVAC system 100 is operating in partial re-circulation mode in which both the fresh air inlet 20 and the re-circulation air inlet 30 are in at least partial open configuration. Preferably, the intermediate door slides to define the deployed and un-deployed configuration thereof. The sliding type configuration of the intermediate door 40 enables operation thereof within less operating space and packing thereof in a limited space inside the housing 10 compared to other types of intermediate doors such as rotary flap type of the door. More specifically, the intermediate door 40 of sliding type moves along a straight line path and requires comparatively less operating space than rotating flap type of door that requires more operating space. Further, the sliding type configuration of the intermediate door enables operation thereof without interfering with operation of the other elements disposed inside the housing 10. Generally, the intermediate door 40 includes a rack that engages with and is actuated by a pinion 50. In accordance with another embodiment, the intermediate door 40 of sliding type includes two portions 40a and 40b movable relative to each other, wherein at least one portion 40a, 40b includes a rack that engages with and is actuated by a corresponding separate pinion 50a, 50b. The intermediate door 40 of sliding configuration moves orthogonally with respect to the heat exchanger 70 disposed within the housing 10. However, the present invention is not limited to any particular configuration and placement of the intermediate door 40, or any particular orientation of the intermediate door with respect to the heat exchanger 70 as far as the intermediate door 40 efficiently blocks the fresh air entering inside the housing 10 through the first inlet 20 from reaching the second inlet 30 and escaping out of the housing 10 through the second inlet 30, when the HVAC system 100 is operating in partial re-circulation mode in which both the fresh air inlet 20 and the re-circulation air inlet 30 are in at least partial open configuration.

The invention claimed is:

1. A Heating Ventilation and Air-Conditioning (HVAC) system comprising:
   a housing adapted to receive a heat exchanger therein;
   at least one first inlet formed on the housing for ingress of a first stream of fluid inside the housing;
   at least one second inlet formed in the housing for ingress of a second stream of fluid inside the housing;
   at least one first door adapted to move with respect to the first inlet to define an open configuration, a closed configuration and a partially open configuration;
   at least one second door adapted to move with respect to the second inlet to define an open configuration, a closed configuration, at least one partially open configuration; and
   an intermediate door disposed between the first inlet and the second inlet and adapted to move between a deployed configuration and an un-deployed configuration,
   wherein the intermediate door in the deployed configuration is adapted to disrupt fluid flow there across,
   wherein the intermediate door in the deployed configuration thereof is in contact with the heat exchanger,
   wherein the intermediate door in the un-deployed configuration thereof is disposed away from the heat exchanger, and
   wherein the intermediate door is a sliding door.

2. The Heating Ventilation and Air-Conditioning (HVAC) system as claimed in claim 1, wherein the first door is in at least partially open configuration, the second door is in closed configuration and the intermediate door is in un-deployed configuration to define a variable ram air mode of operation.

3. The Heating Ventilation and Air-Conditioning (HVAC) system as claimed in claim 1, wherein the first door is in open configuration, the second door is in a first partially open configuration and the intermediate door is in deployed configuration to define a first partial re-circulation mode of operation.

4. The Heating Ventilation and Air-Conditioning (HVAC) system as claimed in claim 1, wherein the first door is in open configuration, the second door is in a second partially open configuration and the intermediate door is in deployed configuration to define a second partial re-circulation mode of operation.

5. The Heating Ventilation and Air-Conditioning (HVAC) system as claimed in claim 1, wherein the first door is in closed configuration, the second door is in open configuration and the intermediate door is in an un-deployed configuration to define a re-circulation air mode of operation.

6. The Heating Ventilation and Air-Conditioning (HVAC) system as claimed in claim 1, wherein the intermediate door comprises a rack that engages with and is actuated by a pinion.

7. The Heating Ventilation and Air-Conditioning (HVAC) system as claimed in claim 1, wherein the intermediate door moves orthogonally with respect to the heat exchanger disposed within the housing.

8. The Heating Ventilation and Air-Conditioning (HVAC) system as claimed in claim 1, wherein the first door is at least one of barrel type door and butterfly flap type of door.

9. The Heating Ventilation and Air-Conditioning (HVAC) system as claimed in claim 1, wherein the second door is at least one of barrel type door and butterfly flap type of door.

10. The Heating Ventilation and Air-Conditioning (HVAC) system as claimed in claim 1, wherein the intermediate door comprises two portions and movable relative to each other, wherein at least one of the portions comprises a rack that engages with and is actuated by a corresponding separate pinion.

* * * * *